United States Patent
Kikuchi et al.

(10) Patent No.: US 6,699,565 B2
(45) Date of Patent: Mar. 2, 2004

(54) PRESSURE-SENSITIVE TRANSFER ADHESIVE TAPE

(75) Inventors: Hidetatsu Kikuchi, Tokyo (JP); Koujirou Matsushima, Tokyo (JP); Kazunobu Tanaka, Osaka (JP); Minoru Enomoto, Tokyo (JP); Tatsuhiro Suwa, Tokyo (JP)

(73) Assignee: Tombow Pencil Co., Ltd., Tokyo (JP)

( * ) Notice: Subject to any disclaimer, the term of this patent is extended or adjusted under 35 U.S.C. 154(b) by 102 days.

(21) Appl. No.: 09/914,791

(22) PCT Filed: Jan. 5, 2001

(86) PCT No.: PCT/JP01/00026

§ 371 (c)(1), (2), (4) Date: Sep. 5, 2001

(87) PCT Pub. No.: WO01/49799

PCT Pub. Date: Jul. 12, 2001

(65) Prior Publication Data

US 2002/0182373 A1 Dec. 5, 2002

(30) Foreign Application Priority Data

Jan. 6, 2000 (JP) ........................................ 2000-005814
Mar. 28, 2000 (JP) ........................................ 2000-088138

(51) Int. Cl.$^7$ ............................. B32B 3/00; B32B 33/00
(52) U.S. Cl. .................. 428/156; 428/41.8; 428/42.1; 428/141; 428/172; 428/343
(58) Field of Search ................................. 428/141, 147, 428/172, 343, 354, 42.1, 156, 41.8

(56) References Cited

U.S. PATENT DOCUMENTS

| 3,386,527 | A | * | 6/1968 | Daubert et al. ............... 181/33 |
| 5,134,012 | A | * | 7/1992 | Arakawa et al. ............ 428/152 |
| 5,362,516 | A | | 11/1994 | Wilson et al. |
| 5,650,215 | A | | 7/1997 | Mazurek et al. |
| 5,897,930 | A | | 4/1999 | Calhoun et al. |

FOREIGN PATENT DOCUMENTS

JP 7-126582 * 5/1995

* cited by examiner

Primary Examiner—Donald J. Loney
(74) Attorney, Agent, or Firm—Sherman & Shalloway

(57) ABSTRACT

The pressure sensitive transferring adhesive tape which transfers adhesive agent layer alone to an adherent is widely well-known, and in this case, the adhesive agent layer applied to a supporter has to be cut after it has been transferred to the adherent. However, since the adhesive layer is coated continuously, this type has a weak point that the adhesive agent layer causes problem of stringiness and stretching and cannot be cut smoothly. In the present invention, above mentioned weak points are dissolved by coating adhesive agent layer by discontinuous island shape pattern or by making the surface of adhesive agent layer to have concave and convex shape.

2 Claims, 1 Drawing Sheet

PRESSURE-SENSITIVE TRANSFER ADHESIVE TAPE

FIELD OF THE INVENTION

The present invention relates to a pressure sensitive transferring adhesive tape which is prepared by forming an adhesive agent layer on a substrate tape.

BACKGROUND OF THE INVENTION

As a kind of double-sided adhesive tape, a non supported double-sided adhesive tape that does not have a supporter (core material) and transfers adhesive agent layer alone to an adherent is well-known and is widely used in various fields as a pressure sensitive transferring adhesive tape. The conventional structural feature of said pressure sensitive transferring adhesive tape is illustrated as follows. That is, an adhesive agent layer is formed on one surface of a releasable liner or a releasable substrate and is wound like a roll. Recently a transferring device characterizing by attaching these small wound type tape roll to a transferring tool is developed and is on the market for the office supplies uses under the name of "tape adhesive".

The transferring device is consisted of;

a feeding reel to which a pressure sensitive transferring adhesive tape is wound;

a transferring head that transfers the adhesive agent layer of the pressure sensitive transferring adhesive tape provided from the feeding reel to an adherent by releasing from the substrate;

and a winding up reel to wind up the used substrate after transferring.

These are arranged in a case that can be handled by one hand.

Figure 1:
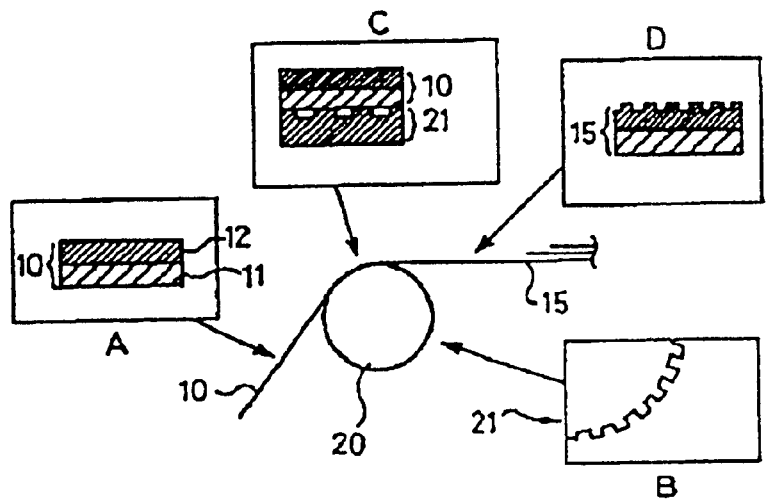

The transferring device is illustrated by FIG. 1. In FIG. 1, a feeding reel 2 which winds and stores the pressure sensitive transferring adhesive tape 5 in a roll state, and a winding up reel 3 which winds up and stores the used substrate after transferring are arranged in a case 1. Said case 1 is a main body of the pressure sensitive transferring device that can be handled by one hand, and is to expose a part of the pressure sensitive transferring adhesive tape from the end point of the case so as the transferring head 4, which transfers the adhesive agent layer to the adherent by releasing it from the substrate, to contact to the adherent.

When said pressure sensitive transferring adhesive tape is used for the adhering means of paper, it displays following strong points compared with the conventional liquid type adhesives or solid type adhesives. Namely, adhesive agent can be easily transferred to the surface of the adherent without making the hands of operator sticky, the drying up time to complete the adhering process is not needed, and the paper, which is the adherent, is not wrinkled. Further, after the necessary length of adhesive tape is transferred to the surface of the adherent, the adhesive agent layer can be cut easily by lifting the transferring device vertically from the surface of the adherent or by moving it to the horizontal direction. Therefore, compared with the conventional double-sided adhesive tape with supporter, it is not necessary to cut the tape previously to the necessary length, and since the releasable substrate from which the adhesive agent layer is released is wound up to the winding up reel, there is no waste at the actual use. That is, it can be said as a very convenient adhesive goods.

However, since the adhesive agent of adhesive agent layer is coated continuously on the surface of releasable substrate, the adhesive agent causes stringiness and stretching problem at the cutting action and cannot be cut smoothly, which is recognized as the problem so called poor adhesive severability.

To avoid the problem, the methods to make the adhesive agent layer form fine dotted shape or to arrange the adhesive agent layer so as to form block shape keeping a distance between blocks are proposed, however, these proposed methods have a problem that the adhering strength becomes weaker in comparison with that of the continuous coating method.

The inventors of this invention have conduced a intensive study to dissolve the above mentioned problem and accomplished the present invention, and the object of the present invention is to provide a pressure sensitive transferring adhesive tape which has the excellent adhesive severability maintaining the sufficient adhering strength.

SUMMARY OF THE INVENTION

The above mentioned object can be accomplished by a pressure sensitive transferring adhesive tape, comprising a substrate on which surface an adhesive agent layer is provided, said adhesive agent layer is characterized to be coated over the surface of the substrate so as to form discontinuous island shape pattern, and the surface area of said one island is from 1 to 100 mm$^2$, further the distance between adjacent islands is from 0.1 to 4 mm.

Further, said object can also be accomplished by a pressure sensitive transferring adhesive tape, comprising a substrate on which surface an adhesive agent layer is provided, the surface of said adhesive agent layer is characterized to have concave and convex shape, and the thickness of concave part is thinner than 80% of the thickness of convex part, further the gel fraction of said adhesive agent layer is bigger than 15% by weight.

Furthermore, it is desirable that the viscosity at 25° C. of adhesive agent composition at the coating process is from 0.1 to 50 Pa·S, and the content of involatile component in said adhesive agent composition is from 10 to 80%.

BRIEF ILLUSTRATION OF THE DRAWINGS

FIG. 1(a) is the front cross sectional view of one example of the pressure sensitive transferring device that uses the pressure sensitive transferring adhesive tape of the present invention, and FIG. 1(b) is the side view thereof. This transferring device is provided with a feeding reel 2 which winds and stores the above mentioned pressure sensitive transferring adhesive tape 5 by roll shape, and a winding up reel 3 which winds up and stores the used substrate after transferring are arranged in a case 1, which is a main body of the pressure sensitive transferring device, and can be handled by one hand. Said case is to expose a part of the pressure sensitive transferring adhesive tape from the end point of the case so as the transferring head 4, which transfers the adhesive agent layer to the adherent by releasing it from the substrate, to contact to the adherent.

Figure 2:
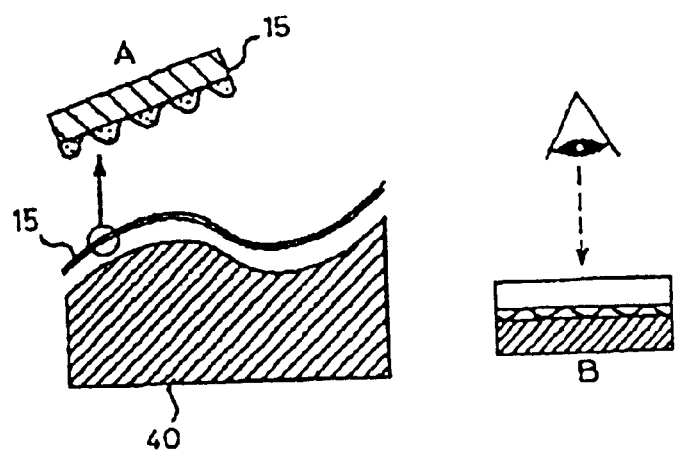

FIG. 2 is a drawing to illustrate the testing method of abrasive severability.

DESCRIPTION OF PREFERRED EMBODIMENTS

The present invention will be illustrated more in detail.

First of all, the case that the adhesive agent of adhesive agent layer of this invention is coated forming discontinuous islands shape pattern is illustrated. The surface area of an individual island of said adhesive layer coated forming the island shape pattern is from 1 to 100 mm², desirably from 3 to 36 mm², and the distance between adjacent islands is from 0.1 to 4 mm, desirably from 0.3 to 2.5 mm. If the surface area of an individual island is larger than 100 mm², the degree of freedom to select the cutting position of the adhesive agent layer becomes limited, on the contrary, if the surface area of individual island is smaller than 1 mm², the contact of the adhesive agent to the adherent becomes not by "area" but by "point" and the sufficient adhesive power can not be obtained. Further, when the distance between adjacent islands is wider than 4 mm, the effective adhesive agent area becomes small and the sufficient adhering strength cannot be obtained. And, when the distance is narrower than 0.1 mm, the adjacent adhesive agent layer contacts with each other, because of the fluidity that the adhesive agent has. Therefore, it becomes difficult to coat the adhesive agent on a substrate by the intended pattern, and the sufficient adhesive severability cannot be obtained.

The island shape pattern of this invention means the pattern that the adhesive agent exists at random scatterly, or exists regularly forming a pattern. The shape of the individual island can be voluntarily selected, and it is desirable that the individual islands are completely divided. The thickness of the adhesive agent layer is usually from 1 to 50 $\mu$m, and desirably is from 2 to 30 $\mu$m. By altering the kind of adhesive agent or coating thickness, various adhesive agent layers having different properties that meets to the uses, such as permanent adhering type or re-releasable type can be obtained.

The adhesive agent layer of the pressure sensitive transferring adhesive tape of the present invention is a layer prepared by coating the adhesive agent on a surface of the releasable substrate by island shape pattern.

As the adhesive agent, any kinds of conventional adhesive can be used. For example, acrylic type, rubber type, silicone type or rosin type can be mentioned, and any kind of additives such as filler, preserving agent or pigment can be used when need is arisen.

As the substrate, any kind of materials which have releasing effect to the adhesive can be voluntarily used. For example, plastic films such as polyethylene, polyethyleneterephthalate, polypropylene or polyvinylchloride, paper such as glassine paper or metallic foil can be mentioned. To one or both surface of the substrate, a releasable layer composed of silicon resin or fluorocarbon resin can be formed to provide the releasing effect when need is arisen. The adequate thickness of the substrate is from 10 to 60 $\mu$m. And, as a method to coat the adhesive agent forming a discontinuous island shape pattern, any kind of methods such as a silkscreen method, a gravure method or an inkjet method can be used.

Secondly, the case that the surface of the adhesive agent layer has a concave and convex shape is illustrated. Regarding to the concave and convex shape, the thickness of concave part is thinner than 80% of the thickness of convex part. When the thickness of concave part is thicker than 80% of the thickness of convex part, the excellent adhesive tearing ability cannot be obtained. Desirably, the thickness of concave part is thinner than 60% of the thickness of convex part. The substantial thickness of convex part is 2 to 200 $\mu$m, and desirably is 5 to 60 $\mu$m. In the adhesive agent layer, the thick portion is the thickness of the convex part and the thin portion is the thickness of the concave part.

The thickness of the adhesive agent layer is measured by following method. That is, a specimen is frozen using liquid nitrogen and sliced by a sharp edged tool, then the cross section is observed by an optical microscope or by an electronic microscope, and the thickness of concave and convex part of the adhesive agent layer are measured.

As the materials of a releasable substrate A on which surface the adhesive agent layer having concave and convex shape can be formed, any kind of materials which have releasing effect to the adhesive can be voluntarily used. For example, plastic films such as polyethylene (PE), Polyethyleneterephthalate (PET), polypropylene (PP) or polyvinylchloride (PVC), paper such as glassine paper or metallic foil can be mentioned. To one or both surface of the substrate, a releasable layer composed of silicon resin or fluorocarbon resin is formed to provide releasing effect when need is arisen. The adequate thickness of the substrate A is from 10 to 60 $\mu$m.

Further, in the present invention, it is necessary that the gel fraction of said adhesive agent layer is bigger than 15%, desirably bigger than 30% by weight. When the gel fraction is low, the coagulating force of the adhesive agent layer becomes weak, and in the case when embossed separator is removed and wound up by a (releasable) substrate, the adhesive agent layer is flown by the winding pressure. It causes a problem that the concave and convex shape becomes unclear. Therefore, in the present invention, the gel fraction of the adhesive agent layer is settled to bigger than 15%, desirably bigger than 30%. The actual gel fraction of acrylic type adhesive layer can not reach to 100% even if the degree of cross-linking is elevated to the highest level, and substantially the maximum value is 98% around.

The gel fraction is measured by the following method.

That is, the pressure sensitive adhesive tape is cut to the prescribed size and the substrate is removed from, thus the specimen of adhesive agent layer is prepared. As the first step, the weight of specimen is weighted. Then the specimen is dissolved into ethyl acetate for two days at the condition of 23° C. and 65% RH. After that, the insoluble part is filtrated by a metallic sieve of 200 mesh and weighted. Calculate the ratio (%) of the insoluble part to the initial weight of the specimen, and the calculated result is the gel fraction.

The preparation method of the pressure sensitive adhesive tape whose shape of the adhesive agent layer is concave and convex shape is illustrated. As the method to form concave and convex shape on the adhesive agent layer, any kind of methods such as a screen method, a gravure method or an embossed separator method can be used, however, among these methods, the embossed separator method is desirably used.

The embossed separator method is a method to use a releasing substrate as a "mold" and said releasing substrate is provided with a concave and convex shape (this releasing substrate is called as an embossed separator or simply shortened as a substrate B) by means of an emboss treatment, a sand brushing or a chemical treatment. Adhesive agent composition is applied to the surface of the embossed separator, dried up and the adhesive agent layer is formed on the surface of the embossed separator. Then, the substrate A is stuck on it so as said adhesive agent layer to transfer on the surface of substrate A. After that, said embossed separator is released and thus the pressure sensitive adhesive tape is obtained.

As the timing to release the embossed separator, any time when the formed concave and convex shape is not get out of shape can be selected. Even if, in a case which needs aging term, the embossed separator can be released before the aging process. Of cause, the embossed separator can be stuck during whole forming term. Or, it is possible to prepare a commercialized goods without releasing the embossed separator, and in this case the embossed separator should be released at the actual use. Further, the embossed separator itself can be used as the substrate A of the pressure sensitive adhesive tape, without sticking the substrate A on the adhesive agent layer.

The embossed separator method is different from a screen method or a gravure method, and the adhesive agent composition can easily form the concave and convex shape, because after coated the adhesive agent composition stays on the embossed separator, which is the mold to form the concave and convex shape, until it looses fluidity by a drying process. Further, in cases of a screen method or a gravure method, since a roll or a screen (pattern) must be prepared according to the intended concave and convex shape, the changing of the pattern is not so easy, while in the case of the embossed separator method, there is a strong point that the adhesive agent layer of concave and convex shape can be obtained by using a conventional coating machine used for a flat coating.

As an embossed separator that can be used for the embossed separator method, any kind of materials which has releasability or a substrate such as film whose surface is treated to have the releability can be mentioned. As the concrete example of the materials, plastic films such as polyethylene (PE), polyethyleneterephthalate (PET), polypropylene (PP) or polyvinylchloride (PVC), paper such as glassine paper or metallic foil can be mentioned, however, not intended to be limited to them. The treatment to provide a releasing effect is carried out to one or both surface of the embossed separator (substrate B) by applying releasing agent such as silicon resin or fluorocarbon resin when need is arisen. The releasing treatment can be carried out before or after the process to provide the concave and convex shape to the embossed separator (substrate B). The preferable thickness of the embossed separator is from 20 $\mu$m to 300 $\mu$m around.

As the pattern of concave and convex shape to be provided to an embossed separator, voluntary shape including a circular shape, a multiple angle shape larger than triangle, a corrugated shape or other random shape can be used, and among these shapes, a circular shape, a regular triangle shape, a perfect square shape, a diamond shape, a regular pentagonal shape, a regular hexagonal and a regular octagonal shape are desirably used. And the numbers of islands per one $cm^2$ is 0.25 to 1000, desirably 2 to 400.

As the means to coat the adhesive agent composition on an embossed separator, any kind of coating machine used for a conventional coating process, such as a roll coater, a die coater, a gravure coater, a bar coater or a knife coater can be used.

As the adhesive agent which compose the adhesive agent layer of the present invention, any kind of conventional adhesive agent used for this kind of adhesive tape can be used. For example, an adhesive agent such as acrylic type, rubber type, silicone type, rosin type, urethane type and polyvinylether type can be mentioned, and these types can be used by solvent state, emulsion state or by non solvent state. It is desirable to blend a hardener to the adhesive agent, further, other additives such as a filler, a preserving agent or a pigment can be added when need is arisen.

When the viscosity of the adhesive agent composition used in this invention is low, the shedding phenomenon of the adhesive agent composition is caused on the surface of embossed separator and the good-coated surface cannot be obtained. While, the viscosity is too high, the defects of uneven coating or stripes are caused and deteriorate the smoothness of the coated surface. And this can be the ground to deteriorate the formation of concave and convex shape and to affect the adhesive property. In the present invention, the adhesive agent composition whose viscosity at 25° C. is from 0.1 to 50 Pa·S, desirably from 2.0 to 20 Pa·S is used. Further, the content of involatile component of said adhesive agent composition is from 10 to 80%, and when is smaller than 10% the formation of concave and convex shape is not sufficient. While, when the content of involatile component is over than 80% the formation of concave and convex shape becomes better, however, it is necessary to make the clearance of a coater head part narrower at the coating process, and causes a problem of preparing process that the embossed separator becomes easy to be broken.

The viscosity of the adhesive agent composition used in the present invention is measured based on the method prescribed in JIS K6 833 6.3 at 25 ±2° C., and as the viscometer, BM type or BL type viscometer of Tokyo Keiki Co., Ltd, is used.

Further, the content of involatile component of said adhesive agent composition used in the present invention is from 10 to 80%. The content of involatile component is measured by the measuring method based on the method prescribed in JIS K5404 4. That is, 1 to 1.5 gr of the adhesive agent composition, which is the specimen, is contained into a glass container of 60 mm diameter and 40 mm height, and heated in a dryer of 105–110° C. temperature for 3 hours without using a cover so as the volatile component to volatilize. Calculate the ratio (%) of the weight of residue to the initial weight of the specimen, and obtained ratio is the content of involatile component.

EXAMPLES

The present invention will be illustrated more readily according to the Examples, however, not intended to be limited to the Examples.

Example 1

Acrylic type adhesive agent is coated by using screen printing method on a surface of a tape substrate made of PET whose both surface is treated a releasable treatment. The adhesive agent layer is coated to form the islands shape pattern, wherein the area of one island is 20 $mm^2$ and the distance between adjacent islands is 1 mm. Thus the pressure sensitive transferring adhesive tape is obtained.

Comparative Example 1

The pressure sensitive transferring adhesive tape is obtained by the same process to Example 1, except making the area of one island 105 $mm^2$.

Comparative Example 2

The pressure sensitive transferring adhesive tape is obtained by the same process to Example 1, except making the area of one island 0.8 $mm^2$.

Comparative Example 3

The pressure sensitive transferring adhesive tape is obtained by the same process to Example 1, except making the distance between adjacent islands 5 mm.

Comparative Example 4

The pressure sensitive transferring adhesive tape is obtained by the same process to Example 1, except making the distance between adjacent islands 0.05 mm. Since the distance between adjacent islands is too narrow the islands are contacted each other and intended island shape pattern cannot be obtained.

The obtained specimens of pressure sensitive transferring adhesive tape are installed in transferring devices and the adhesive severability and adhesive strength are evaluated by three ranks; ○Δx. The obtained results are shown in Table 1.

In the evaluation of the adhesive severability, the factor that "to be cut at the intended point" is included.

According to the results of above mentioned Example and Comparative Examples, it has became clear that the poor cutting of the adhesive agent layer caused by the stringiness can be improved maintaining sufficient adhesive strength by above mentioned measures; namely, coating the adhesive agent of the adhesive agent layer over the surface of the substrate so as to form discontinuous island shape pattern, making the surface area of said one island to be from 1 to 100 mm$^2$, further making the distance between adjacent islands to be from 0.1 to 4 mm.

TABLE 1

|  |  | Example | Comparative Example | | | |
|---|---|---|---|---|---|---|
|  |  | 1 | 1 | 2 | 3 | 4 |
| conditions of adhesive agent layer | size of an island | 20 | 105 | 0.8 | 20 | 20 |
|  | distance between islands | 1 | 1 | 1 | 5 | 0.05 |
| evaluation of ability | adhesive severability | ○ | x | ○ | ○ | Δ |
|  | adhesive strength | ○ | ○ | x | | ○ |
|  | coating performance | ○ | ○ | Δ | ○ | x | unit of island area is mm$^2$, and unit of distance between adjacent islands is mm.

Examples 2–7

Acrylic type polymers and hardeners shown in Table 2 are mixed together according to the following method and adhesive agent compositions are obtained.

A. Preparation of Adhesive Agent Composition (1) acrylic type polymer 100 parts of acrylic type polymer is mixed with solvent and poured into a flask, then heated to 65° C. under the flow of nitrogen gas and polymerized by adding an initiator.

(2) hardener 2 parts of Coronate L (Product of Nihon Polyurethane Co., Ltd.) by solid part is added as a hardener to the polymer solution obtained by (1).

(3) adhesive agent composition

The viscosity and contents of involatile component of the adhesive agent composition are shown in Table 2.

B. Preparation of the Adhesive Agent Composition

Specimens are prepared using a coater for adhesive application equipped with a micro bar by which the clearance between a back up roller can be voluntarily adjusted. That is, the adhesive agent compositions obtained by above mentioned method are coated on the releasable treated surface of the embossed separator, then a PET film whose both surface are treated by releasable treatment is stuck and wound up so as to proceed the aging of adhesive agent.

After the aging process, the embossed separator is removed, slitting it by 1 cm width, and a backing wound type tape is prepared. The prepared tape is evaluated by test methods described in item C.

The embossed separator used above is prepared by using an embossed roll, the gap of convex part and concave part of which is 30 $\mu$m, using PET film of 38 $\mu$m thickness whose concave surface is treated by releasable treatment.

Comparative Examples 5–9

Specimens are prepared by same processes to Example 1 using adhesive agent compositions consisted of different components, having different content of involatile component and different viscosity as shown in Table 2 except using the same embossed separator having same embossed height (30 $\mu$m) to Examples. The adhering property to woodfree paper and the adhesive severability are measured.

C. The Measuring Method

The adhering property to woodfree paper and the adhesive severability of specimen obtained by Examples 2 to 7 and Comparative Examples 5 to 9 are measured.

(1) Adhering property to woodfree paper

A tape obtained by above mentioned method is stuck to the woodfree paper cut to 2 cm width. The releasable PET film is removed and the woodfree paper is stuck to, then pressed by go and back action of a roller of 1 kg weight. Just after the pressing, the woodfree paper is removed and the removing state is observed.

○; plucking of woodfree paper is observed in whole surface x; plucking of woodfree paper is not observed (2) Adhesive severability At the 5 cm point from the end of tape obtained by above mentioned method, a mark is put. The tape is extended to the mark and stuck to the woodfree paper of 2 cm width. The end of the releasable PET film of stuck part is released toward the vertical direction from the woodfree paper, and the severed state of the position 5 cm apart from the end is observed (refer to FIG. 2).

severability ○; position less than 3 mm apart from the mark adhesive layer is severed severability x; more than 5 mm apart from the mark is necessary to be severed.

Obtained results are summarized in Table 2 and Table 3.

TABLE 2

|  |  |  | Example | | | | | |
|---|---|---|---|---|---|---|---|---|
|  |  |  | 2 | 3 | 4 | 5 | 6 | 7 |
| acrylic type polymer | blending amount | parts | 100 | 100 | 100 | 100 | 100 | 100 |
| hardener (Corronate L) | blending amount to solid part | parts | 2 | 2 | 2 | 2 | 2 | 2 |

TABLE 2-continued

|  |  |  | Example | | | | | |
|---|---|---|---|---|---|---|---|---|
|  |  |  | 2 | 3 | 4 | 5 | 6 | 7 |
| adhesive composition | Involatile | % | 50 | 50 | 50 | 15 | 70 | 70 |
|  | component viscosity | pa·s/ 25° C. | 1 | 10 | 30 | 10 | 10 | 30 |
| height of emboss |  | μm | 30 | 30 | 30 | 30 | 30 | 30 |
| coater clearance |  | μm | 90 | 90 | 90 | 170 | 75 | 75 |
| adhesive agent layer | convex*1 | μm | 25 | 22 | 20 | 20 | 25 | 23 |
|  | concave*1 | μm | 11 | 11 | 10 | 15 | 4 | 3 |
|  | ratio*2 | % | 44 | 50 | 50 | 75 | 16 | 13 |
|  | gel fraction | % | 40 | 45 | 48 | 60 | 30 | 35 |
| adhesive severability |  |  | ○ | ○ | ○ | ○ | ○ | ○ |
| adhering property to woodfree paper |  |  | ○ | ○ | ○ | ○ | ○ | ○ |

*1 thickness,
*2 ratio of thickness of convex/concave part

TABLE 3

|  |  |  | Comparative Example | | | | |
|---|---|---|---|---|---|---|---|
|  |  |  | 5 | 6 | 7 | 8 | 9 |
| acrylic type polymer | blending amount | parts | 100 | 100 | 100 | 100 | 100 |
| hardener (Corronate L) | blending amount solid part | parts | 0 | 2 | 2 | 2 | 2 |
| adhesive composition | Involatile | % | 50 | 5 | 50 | 50 | 90 |
|  | component viscosity | pa·s/ 25° C. | 10 | 10 | 0.05 | 70 | 10 |
| height of emboss |  | μm | 30 | 30 | 30 | 30 | 30 |
| coater clearance |  | μm | 90 | 440 | 90 | 90 | 60 |
| adhesive agent layer | convex*1 | μm | 20 | 20 | cannot be coated | cannot be coated | cannot be coated |
|  | concave*1 | μm | 18 | 18 |  |  |  |
|  | ratio*2 | % | 90 | 90 |  |  |  |
|  | gel fraction | % | 0 | 70 |  |  |  |
| adhesive severability |  |  | x | x | (*3) | (*4) | (*5) |
| adhering property to woodfree paper |  |  | ○ | x |  |  |  |

*1 thickness,
*2 ratio of thickness of convex/concave part
*3 cannot be coated because shedding is caused on the coating surface
*4 cannot be coated because uneven coating is caused on the coating surface
*5 cannot be coated because shearing of embossed separator is caused As clearly understood from the above mentioned results, the pressure sensitive transferring adhesive tape of excellent adhesive severability can be provided by a pressure sensitive transferring adhesive tape, comprising a substrate on which surface an adhesive agent layer is provided, the surface of said adhesive agent layer is characterized to have concave and convex shape, and the thickness of concave part is thinner than 80% of the thickness of convex part, further the gel fraction of said adhesive agent layer is bigger than 15% by weight.

Possibility to the Industrial Use

As mentioned above, the pressure sensitive transferring adhesive tape of excellent adhesive severability of the present invention can be provided by coating an adhesive agent layer by discontinuous island shape pattern or by coating an adhesive agent layer so as to have convex and concave shape maintaining excellent sufficient adhering strength.

What is claim:

1. A pressure sensitive transferring adhesive tape, comprising a substrate on which surface an adhesive agent layer is provided, said adhesive agent layer is characterized to be coated over the surface of the substrate so as to form discontinuous island shape pattern, and the surface area of said one island of said adhesive agent is from 1 to 100 mm², further the distance between adjacent islands is from 0.1 to 4 mm.

2. A pressure sensitive transferring adhesive tape, comprising
   a releasable substrate having a first surface on which an adhesive agent layer is provided,
   said adhesive agent layer having a second surface is characterized to have an alternating concave and convex shape, and the thickness of concave part is thinner than 80% of the thickness of convex part
   wherein the viscosity at 25° C. of the adhesive agent composition at the coating process is from 0.1 to 50 Pa·S, and the content of involatile component in said adhesive agent composition is from 10 to 80%,
   further the gel fraction of said adhesive agent layer is bigger than 15% by weight.

* * * * *